Dec. 30, 1969

A. M. HENKE ETAL 3,487,011

HYDRODESULFURIZATION OF NAPHTHAS

Filed Nov. 23, 1966

INVENTORS.
ALFRED M. HENKE
RONALD V. LUZAR
JOEL D. McKINNEY 3,487,011
HYDRODESULFURIZATION OF NAPHTHAS
Alfred M. Henke, Springdale, Ronald V. Luzar, Pittsburgh, and Joel D. McKinney, Indiana Township, Allegheny County, Pa., assignors to Gulf Research & Development Company, Pittsburgh, Pa., a corporation of Delaware
Filed Nov. 23, 1966, Ser. No. 596,541
Int. Cl. C10g 23/02
U.S. Cl. 208—216                 5 Claims

ABSTRACT OF THE DISCLOSURE

The final sulfur content of naphtha is significantly reduced by hydrodesulfurizing the naphtha over a novel nickel-cobalt-molybdenum catalyst having silica in the active hydrogenating portion.

---

Figure 1:
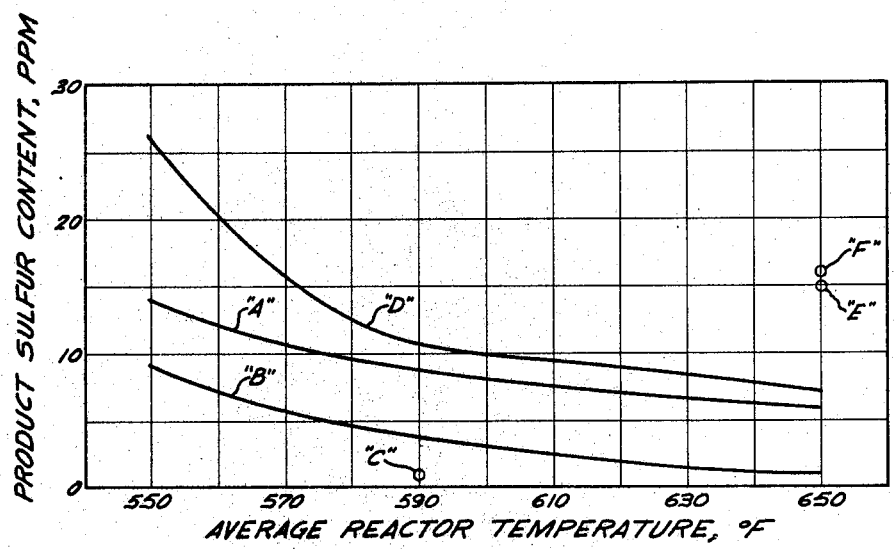

This invention relates to an improved catalyst and to an improved catalytic hydrodesulfurization process.

The hydrodesulfurization of petroleum naphthas prior to reforming is a well known pretreatment which is carried out to protect the reforming catalysts against sulfur poisoning. In recent years improvements in reforming catalysts have concomitantly made them more sensitive to sulfur. Such catalysts may require a naphtha feed containing as little as one p.p.m. sulfur or less to ensure adequate reformer catalyst life. The most active naphtha hydrodesulfurization catalyst of the presently used catalysts, such as one formed from a mixture of iron group metal oxides or sulfides with the oxide or sulfide of molybdenum, for example, one formed from the oxides of nickel, cobalt and molybdenum, can only accomplish this required low sulfur level, if at all, at rather severe desulfurization conditions. Unfortunately however, many of these naphtha pretreating units were designed to operate at mild hydrotreating conditions to remove sulfur to a level of about 10 to 50 p.p.m. sulfur as required for the then utilized reforming catalysts, and cannot be operated at more rigorous conditions. The only alternatives to reaching a sulfur level of about one p.p.m. are to replace the pretreating units with those which can operate at more severe conditions or to use a more active catalyst.

According to our invention we have discovered a hydrodesulfurization catalyst of significantly improved activity such that naphtha sulfur levels of about one p.p.m. and less can be attained at the relatively mild conditions for which the presently existing pretreating units were designed. Furthermore, these improved catalysts are equally desirable for newly constructed pretreating units in order to avoid increased construction costs which would otherwise be necessitated to permit greater severity of operation with the presently used naphtha hydrodesulfurization catalysts. Our invention also includes a hydrodesulfurization process utilizing this catalyst.

In our invention the aforementioned mixed iron metal group—molybdenum catalysts, hereinafter called the base catalysts, are modified to cause a significant increase in their activity by promoting the active hydrogenating components with silica prior to sulfiding to produce the finished catalyst of this invention, hereinafter called the improved catalysts. The improved catalyst contains as active hydrogenating components molybdenum and at least two members of the iron group metals. The iron group components of this improved catalyst are present in such amounts that the sum of the atomic ratios of the iron group metals to molybdenum is less than about 0.8 and the atomic ratio of each iron group metal to molybdenum is less than about 0.4. These active hydrogenating components are present as oxides and/or sulfides of the metals and may be in combinations of the oxides or sulfides of the iron group with the oxide or sulfide of molybdenum.

The base catalyst may contain molybdenum in the amounts conventionally used, i.e. about 2 to about 25 percent molybdenum based on the total weight of the catalyst including carrier. Smaller amounts of molybdenum than two percent may be used but this reduces the activity. Larger amounts than 25 percent can also be used but do not increase the activity and constitute an extra expense. We prefer to utilize a catalyst containing between about 4 and 16 percent molybdenum. The amounts of the iron group metal may be varied as long as the above proportions are used. However, we prefer to utilize one iron group metal in an atomic ratio between about 0.1 and 0.5, preferably between about 0.2 and 0.4, and to utilize the other iron group metal or metals in an atomic ratio of iron group metal to molybdenum of between about 0.01 and 0.3, preferably between about 0.05 and 0.2. All of the iron group metals may be present, but we prefer to use only two. When nickel and cobalt are used, the catalyst will preferably contain from about 0.5 to about 4.0 percent nickel and from about 0.1 to about 2.0 percent cobalt.

The above mentioned active hydrogenating components may be present as mixtures of oxides and/or sulfides. On the other hand chemical combinations of the iron group metal oxides or sulfides with the molybdenum oxide and/or sulfide may be utilized. Methods of preparing such mixed oxide or sulfide catalysts or combinations of oxide or sulfide catalysts are well known in the prior art. Any such method may be used. Aqueous solutions of the water soluble salts of these active hydrogenating components are often used to impregnate supports or carriers. These carriers are of a foraminous or porous nature and any such support may be used. Examples of satisfactory supports are alumina, alumina stabilized with a small amount of silica such as about 2 to 10 percent silica, bauxite and silica-alumina cracking catalysts. Silica, which may be integrally incorporated in the support during its formation for alumina stabilization, is independent of silica subsequently added by impregnation to promote the desulfurization activity of the finished catalyst. Moreover, the silica containing alumina support is less preferred to alumina alone because the silica in the support tends to interfere with the metals deposition. The supports are usually shaped such as in the form of granules, pellets or balls prior to impregnation. On the other hand, the catalyst may be in the form of a powder such as is used for fluid type operations.

One preferred method of making the base catalyst is to first deposit the molybdenum component from an aqueous solution such as aqueous ammonium molybdate, ammonium paramolybdate, molybdenum pentachloride or molybdenum oxalate. Vacuum impregnation may be used to improve the impregnation. After filtering and drying, the impregnant is calcined to convert it into the oxide. The carrier is then treated with an aqueous solution of the iron group metal salt followed by calcining. Thereafter the second iron group metal is deposited in the same way. Nitrates or acetates of the iron group metals are preferably utilized although any water soluble salt which leaves no harmful residue can be used. If desired, simultaneous impregnation of the iron group metals is quite satisfactory. Also, the iron group metals and molybdenum may be deposited simultaneously followed by calcining. Alternatively all of the active hydrogenation components may be coprecipitated on a preformed support. Additionally, the base catalysts may be made by a mix-mull technique in which the metal salts and alumina are mixed with sufficient liquid to form a pasty mass prior to forming and calcining. Calcining is usually accomplished by heating in air to a temperature of about 800°–1200° F.

The improved catalyst may be formulated by impregnating the base catalyst with a suitable source of silica which does not contain a significant quantity of alkali metal and fixing the silica by heating. The silica source may be an organo-siliceous compound such as ethyl orthosilicate, a colloidal silicic acid obtained by passing a sodium silicate solution such as water glass through an ion-exchange material, or other suitable equivalent source. Also cobalt or nickel fluosilicate may be utilized by a source of part or all of the silica and iron group metal constituent. Hydrodesulfurization promotion is accomplished by incorporating silica with the active hydrogenation components of the catalyst in an appropriate manner such that the improved catalyst contains between about 0.1 and 10.0 percent silica and preferably between about 0.5 and 3.0 percent silica calculated as $SiO_2$. When processing naphtha charge stocks containing less than about 1,500 p.p.m. sulfur, it is preferred that the improved catalyst be presulfided. With the charge stocks containing a greater amount of sulfur, the catalyst will be properly sulfided within the first hours, e.g., within 24 hours of the hydrodesulfurization treatment without separate presulfiding.

Unexpectedly we have discovered that the improved catalysts of our invention are more active for the hydrodesulfurization of petroleum naphtha than the base catalyst but that no distinct improvement in activity is discerned when other fractions, e.g., furnace oils and gas oils, are hydrodesulfurized. Thus, although the improved catalyst may be equally as useful as the base catalyst to hydrodesulfurize sulfur-containing hydrocarbons in general, its preferred use is in the hydrodesulfurization of naphthas where it exhibits its unexpectedly superior activity. This includes both virgin and cracked naphthas boiling in the range of approximately 100°–400° F., including naphthas from fluid catalytic cracking operations, naphthas from thermal cracking operations, coker naphthas, etc.

The hydrodesulfurization of naphthas with the improved catalyst of this invention is carried out at an elevated temperature but no greater than about 750° F. and within a preferred temperature range of between about 580° and 650° F. The broad operating pressure range for this purification reaction is between about 100 to 1,000 p.s.i.g. and the preferred operating pressure is between about 300 and 750 p.s.i.g. The naphtha-hydrogen gas mixture is passed through the catalyst at a liquid hourly space velocity of about 2 to 12 with a preferred space velocity of about 4 to 8. Hydrogen of at least 50 percent purity and preferably at least 70 percent purity is used at a rate of about 150 to 1,000 s.c.f. (standard cubic feet at 60° F.) per barrel of naphtha or at a preferred rate of about 300 to 600 s.c.f. per barrel of naphtha. The mol ratio of hydrogen to naphtha is between about 0.2 to 1.0 or preferably between about 0.25 and 0.70. It is to be understood that in any particular hydrodesulfurization operation the conditions must be varied and intercorrelated within the ranges specified above to obtain specifically desired results.

The following specific examples describe the manufacture of the improved catalyst of this invention and its use in the hydrodesulfurization of petroleum naphtha.

EXAMPLE 1

A strongly ammoniacal solution of ammonium paramolybdate, nickel nitrate, and cobalt nitrate was charged along with a sufficient alumina powder to form a mixture having a pasty consistency after mixing in a mix-muller. The paste was dried to extrusion consistency and extruded into 1/16-inch pellets. The extrudates were dried at about 250° F. for 24 hours and calcined in air in an electric furnace by heating to 1,000° F. in six hours and holding at this temperature for about 10 hours. This calcined base catalyst analyzed 11.0 percent molybdenum, 2.3 percent nickel, and 1.25 percent cobalt.

EXAMPLE 2

The improved catalyst of this invention was formed in exactly the same manner as described above except that sufficient colloidal silica (commercially available from Du Pont as Ludox, a low sodium silica sol) was included in the metals solution to incorporate 2.0 percent silica in the finished calcined catalyst. The calcined improved catalyst analyzed 11.0 percent molybdenum, 2.3 percent nickel, 1.25 percent cobalt, and 2.0 percent silica.

EXAMPLE 3

The activities of the base catalyst of Example 1 and the improved catalyst of Example 2 were compared at different temperatures in a hydrodesulfurization pilot plant (except as noted). The runs were carried out on 300° to 400° F. (true boiling point) virgin naphtha containing 0.04 percent sulfur at 300 p.s.i.g. (hydrogen partial pressure equals 70 p.s.i.a.) and a liquid hourly space-velocity of 5.5 in the presence of 300 s.c.f./bbl. of 85 percent hydrogen. Both catalysts were fully presulfided, and aged for comparable periods. FIGURE 1 is a graphical illustration comparing these two catalysts.

Curve A illustrates the activity of the base catalyst and curve B the activity of the improved catalyst over the range of 550° to 650° F. It is noted that the improved catalyst maintained a consistent five p.p.m. sulfur removal advantage when compared with the most active commercial hydrodesulfurization catalyst, i.e. the base catalyst, at any temperature within the tested range. Stated otherwise it demonstrated approximately an 80° F. activity advantage over its closest competitor of the group of highly active hydrodesulfurization catalysts.

Point C represents the actual operation of the improved catalyst in a refinery hydrodesulfurization unit after about two months of continuous operation, all conditions of operation being the same as used in obtaining the pilot plant data except that the space velocity has been increased to 6.1 LHSV. It is noted that the catalyst after actual plant use shows an activity advantage of about 60° F. over that indicated by the pilot plant data.

Curve D compares a commercially available sulfided nickel-molybdenum oxide hydrodesulfurization catalyst. The results of one run of a commercially available sulfided nickel-tungsten oxide catalyst at 650° F. fell on Curve D.

In addition a comparison of the improved catalyst prior to sulfiding at Point E is made with the base catalyst prior to sulfiding at Point F. It is noted that silica impregnation without sulfiiding improves the sulfur removal ability at 650° F. by one p.p.m., from 16 to 15. Sulfiding improves the base catalyst sulfur removal ability by 10 p.p.m., from 16 to 6. Unexpectedly, however, the combination of silica impregnation and sulfiding improves the sulfur removal capacity by 15 p.p.m. (from 16 to 1 p.p.m. in the product) rather than by 11 p.p.m. The reason for this unexpectedly high sulfur removal resulting from silica impregnation and presulfiding is not understood.

EXAMPLE 4

In this experiment the effect of pressure is evaluated in the hydrodesulfurization of a naphtha containing 0.33 weight percent sulfur using the base catalyst of Example 1 and the improved catalyst of Example 2. The 56.2° API gravity naphtha charge consisted of 25 volume percent visbreaker naphtha from a Kuwait crude admixed with virgin naphtha. All runs were carried out at about 625° F. at a liquid hourly space velocity of 5.0 at different hydrogen partial pressures.

Figure 2:
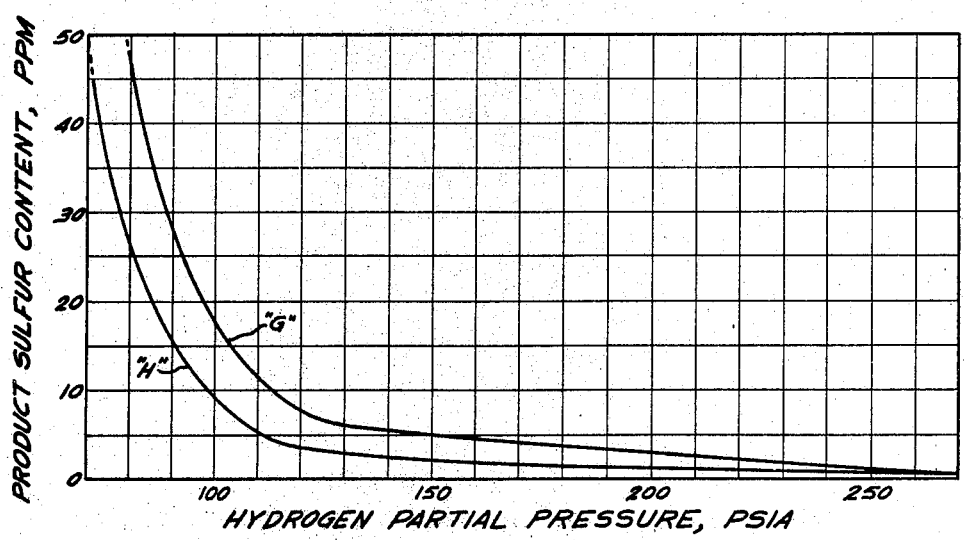

The results of this comparison experiment are shown in FIGURE 2 in which Curve G illustrates the results of a series of runs using the base catalyst and Curve H represents a series of runs using the improved catalyst. It is noted at the particular conditions of operation that there is no significant hydrodesulfurization difference between the two catalysts at a hydrogen partial pressure of 260 p.s.i.a. (800 p.s.i.g. total pressure). However, at lower hydrogen partial pressures the improved catalyst is significantly superior. For example, at a hydrogen partial pressure of 170 p.s.i.a. (605 p.s.i.g. total pressure) the product is purified to approximately one p.p.m. sulfur using the improved catalyst while the base catalyst purifies the naphtha to only about four p.p.m. sulfur. This superior sulfur removal at lower hydrogen partial pressures is of substantial economic significance since it permits the use of existing low pressure hydrodesulfurization equipment for high sulfur removal and permits the installation of lower pressure equipment in new hydrodesulfurization plants.

Analysis for sulfur in all cases was made by an oxyhydrogen combustion procedure particularly suited for determining total sulfur, including elemental sulfur, in light hydrocarbon materials. In this procedure the sample is burned in the oxyhydrogen flame of a Wickbold burner. The oxides of sulfur are absorbed and oxidized to sulfuric acid with hydrogen peroxide and the sulfur is determined turbidimetrically as barium sulfate. The lower limit of sensitivity of the method is one p.p.m. sulfur. In a series of runs initially using a fully sulfided aged catalyst at 650° F. and a liquid hourly space velocity of 5.5, a decrease in temperature to 625° F. with an increase in space velocity in stages up to 12 and a decrease in temperature to 600° F. at a space velocity of 5.5 produced little or no effect on product sulfur, indicating that essentially complete removal of sulfur was being accomplished and that the as-analyzed sulfur content of about one p.p.m. was the result of the minimum sensitivity of the analytical procedure.

An alternative to the method for producing the improved catalyst of this invention as described in Example 2 involves the impregnation of extruded alumina pellets with an ammonium monomolybdate solution followed by oven-drying, next the impregnation with a nickel nitrate-cobalt nitrate solution followed by oven-drying, and finally the impregnation with the silica sol followed by oven-drying and calcining. Alternatively the silica sol may be mixed with the ammonium molybdate solution and used to impregnate the alumina or a pH-stabilized four-component molybdenum-nickel-cobalt-silica sol mixture can be used for impregnating the extrudates.

Also, ammonium paramolybdate powder may be mechanically mixed in a mixer-muller with an appropriate amount of alumina powder while adding sufficient nickel-cobalt solution. The paste is partially dried to about 50 percent solids and then sufficient silica sol is mix-mulled with the paste. The product is then dried to extrusion consistency, extruded, dried and calcined. In an additional procedure alumina powder is mixed-mulled with an ammonium molybdate solution, partially dried and extruded, the extrudate impregnataed with a nickel-cobalt-silica sol solution, followed by drying and calcining. Another procedure involves the dry mixing of the alumina with the molybdenum compound followed by mixing-mulling with silica sol, extruding, drying, impregnating with nickel and cobalt, and then drying and calcining.

These variations in formulating the catalyst of this invention merely represent a portion of the possible formulating procedures. Variations and adjustments may be made to accommodate individual convenience and economical requirements provided that the final catalytic activity is maintained in accordance with requirements described herein. It is of significance to note in all of the variety of formulating procedures that the silica sol is added in association with the metals on top of the solid, preformed alumina.

As indicated it is essential that the silica promoted catalyst be sulfided in order to acquire its high hydrodesulfurization activity. Fortunately in treating naphthas containing at least 0.15 percent sulfur, the fresh catalyst will be effectively sulfided in 24 hours or less by the sulfur contained in the feed. In this instance the feed naphtha is treated in the fresh catalyst bed and stored for recycle to reduce the sulfur content to the desired level after the catalyst has been adequately sulfided. When the feed naphtha sulfur content is below this amount the fresh catalyst is presulfided in a manner known in the art preferably using ethyl mercaptan or hydrogen sulfide. A fully sulfided catalyst contains about five percent sulfur.

Although nitrogen does not represent as an important a catalyst poisoning problem in naphthas as does sulfur, primarily because the nitrogen is concentrated in the higher boiling petroleum fractions, we have discovered by additional studies that the improved catalyst described herein is also the best naphtha pretreating catalyst of reasonable cost with respect to denitrogenation. This catalyst provides excellent performance over a wide range of operating severities including low hydrogen partial pressures and high throughput and its high desulfurization and denitrogenation activity is completely recoverable by conventional steam-air regeneration. This is wholly unexpected because experience indicates that a loss of activity should follow a steam-air regeneration of a silica promoted catalyst. Furthermore it unexpectedly has been found that the regenerated catalyst sulfides much more readily than the fresh catalyst.

It is to be understood that the above disclosure is by way of specific example and that numerous modifications and variations are available to those of ordinary skill in the art without departing from the true spirit and scope of our invention.

We claim:

1. The process of desulfurizing a sulfur-containing naphtha which comprises contacting the naphtha with hydrogen under hydrodesulfurization conditions and while in the presence of a catalyst, said catalyst containing an active hydrogenating portion and a porous support, said active hydrogenating portion containing active metal hydrogenating components which consist essentially of molybdenum and at least two members of the iron group metals, and said active hydrogenating portion additionally containing about 0.1 to about 10 percent silica added to said support in association with said metals, said percent silica based on the entire catalyst weight, the iron group components being present in such amounts that the sum of the atomic ratios of the iron group metals to molybdenum is less than about 0.8 and the atomic ratio of each iron group metal to molybdenum is less than about 0.4, said active metal hydrogenating components being present in the form of a member of the group consisting of oxides of said metals, sulfides of said metals, combinations of the oxides of the iron group metals with molybdenum oxide and combinations of the sulfides of the iron group metals with molybdenum sulfide.

2. A process in accordance with claim 1 in which the said active hydrogenating portion contains from about 0.5 to about 3.0 percent silica added to said support in association with said metals, said percent silica based on the entire catalyst weight.

3. A process in accordance with claim 2 in which the active hydrogenating portion contains from about 4 percent to about 16 percent molybdenum, from about 0.5 percent to about 4.0 percent nickel, and from about 0.1 percent to about 2.0 percent cobalt, all percentages based on the entire catalyst weight, the atomic ratio of nickel to molybdenum being about 0.2 to about 0.4 and the atomic ratio of cobalt to molybdenum being between about 0.05 to about 0.2.

4. A process in accordance with claim 2 in which said hydrodesulfurization is conducted at a hydrogen partial pressure between about 70 and about 250 p.s.i.a. and the temperature is between about 550° and about 750° F.

5. A process in accordance with claim 4 in which the hydrogen partial pressure is about 70 p.s.i.a. and the temperature is about 590° F.

References Cited

UNITED STATES PATENTS

| | | | |
|---|---|---|---|
| 2,840,513 | 6/1958 | Nathan. | |
| 2,793,170 | 5/1957 | Stiles et al. | 252—439 X |
| 3,016,347 | 1/1962 | O'Hara | 208—216 |
| 3,116,234 | 12/1963 | Douwes et al. | 208—216 X |
| 3,167,497 | 1/1965 | Solomon | 252—458 X |

DANIEL E. WYMAN, Primary Examiner

C. F. DEES, Assistant Examiner

U.S. Cl. X.R.

252—458